US009464896B2

(12) United States Patent
Yamamoto

(10) Patent No.: US 9,464,896 B2
(45) Date of Patent: Oct. 11, 2016

(54) DEVICE FOR MEASURING ROTATION ANGLE ACCELERATION

(71) Applicant: NATIONAL INSTITUTE OF ADVANCED INDUSTRIAL SCIENCE AND TECHNOLOGY, Tokyo (JP)

(72) Inventor: Yasuyuki Yamamoto, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/409,109

(22) PCT Filed: May 15, 2013

(86) PCT No.: PCT/JP2013/063505
§ 371 (c)(1),
(2) Date: Dec. 18, 2014

(87) PCT Pub. No.: WO2013/190931
PCT Pub. Date: Dec. 27, 2013

(65) Prior Publication Data
US 2015/0176994 A1    Jun. 25, 2015

(30) Foreign Application Priority Data

Jun. 22, 2012 (JP) .................................. 2012-140644

(51) Int. Cl.
*G01C 19/00* (2013.01)
*G01C 19/5705* (2012.01)
(Continued)

(52) U.S. Cl.
CPC ....... *G01C 19/5705* (2013.01); *G01C 19/5712* (2013.01); *G01L 1/2243* (2013.01); *G01L 3/1428* (2013.01); *G01P 15/0888* (2013.01)

(58) Field of Classification Search
CPC .......... G01C 19/5705; G01C 19/5712; G01L 3/1428; G01L 1/2243; G01P 15/0888
See application file for complete search history.

(56) References Cited

U.S. PATENT DOCUMENTS 5,251,484 A * 10/1993 Mastache ............ G01P 15/0888
73/514.02

5,818,227 A * 10/1998 Payne .................. G01R 33/038
324/259

(Continued)

FOREIGN PATENT DOCUMENTS

CN          1954193 A      4/2007
DE      102004046411 A1    4/2006

(Continued)

OTHER PUBLICATIONS

International preliminary report on patentability of PCT/JP2013/063505, dated Dec. 31, 2014.

(Continued)

*Primary Examiner* — Harshad R Patel
*Assistant Examiner* — Samir M Shah
(74) *Attorney, Agent, or Firm* — Kristina Castellano; Castellano PLLC

(57) ABSTRACT

In a case where (i) accelerations except a specific angular acceleration cause a problem of noise and (ii) low-cost production is required, the present invention provides a device for measuring an angular acceleration which device has reduced noise that is caused by accelerations except the specific angular acceleration, by having an arrangement in which an oscillator is supported by a spring structure capable of greatly restraining movement in directions except a specific rotation direction.

A device for measuring an angular acceleration integrally fabricated by a semiconductor microfabrication technology, the device including: an oscillator rotating around a rotating shaft as a center; a plurality of nodes for supporting the oscillator, the plurality of nodes each being provided at a point on a circle whose radius is r and whose center is the rotating shaft; a plurality of parallelogram links each having arms whose length is r, the arms making movement of the plurality of nodes supporting the oscillator become circular movement around the rotating shaft as a center; a supporting section for supporting fixed nodes of the plurality of parallelogram links; a rotation angle detecting section for detecting a rotation angle; and a calculation section for calculating an angular acceleration from the rotation angle.

2 Claims, 3 Drawing Sheets

(51) Int. Cl.
  *G01C 19/5712* (2012.01)
  *G01P 15/08* (2006.01)
  *G01L 1/22* (2006.01)
  *G01L 3/14* (2006.01)

(56) References Cited

U.S. PATENT DOCUMENTS

| | | | | |
|---|---|---|---|---|
| 6,094,985 | A * | 8/2000 | Kapels | G01C 19/5712 73/504.13 |
| 6,508,124 | B1 | 1/2003 | Zerbini et al. | |
| 6,520,017 | B1 * | 2/2003 | Schoefthaler | G01P 15/0802 73/514.02 |
| 6,718,826 | B2 * | 4/2004 | Zarabadi | G01P 15/0888 73/514.32 |
| 8,413,506 | B2 * | 4/2013 | Coronato | G01C 19/5712 73/504.12 |
| 8,479,575 | B2 * | 7/2013 | Kempe | G01C 19/5747 73/504.12 |
| 8,794,069 | B2 * | 8/2014 | Katsumata | G01C 19/5712 73/504.04 |
| 9,163,663 | B2 * | 10/2015 | Nashima | G01N 11/14 384/125 |
| RE45,792 | E * | 11/2015 | Coronato | G01C 19/5712 73/504.02 |
| 9,250,146 | B2 * | 2/2016 | Krans | G01L 1/205 73/862.44 |
| 9,278,847 | B2 * | 3/2016 | Cazzaniga | G01C 19/5712 73/504.12 |
| 2003/0086751 | A1 * | 5/2003 | Culpepper | F16C 11/12 403/52 |
| 2004/0211257 | A1 | 10/2004 | Geen | |
| 2005/0229703 | A1 | 10/2005 | Geen et al. | |
| 2005/0229705 | A1 | 10/2005 | Geen | |
| 2008/0100776 | A1 | 5/2008 | Miyachi | |
| 2010/0109991 | A1 | 5/2010 | Miyachi | |
| 2012/0206672 | A1 | 8/2012 | Miyachi | |
| 2014/0078431 | A1 | 3/2014 | Miyachi | |
| 2015/0159691 | A1 * | 6/2015 | Nashima | G01N 11/14 384/125 |

FOREIGN PATENT DOCUMENTS

| | | |
|---|---|---|
| EP | 2851573 A1 | 3/2015 |
| JP | 63-040866 | 2/1988 |
| JP | 09-512904 | 12/1997 |
| JP | 2001-147236 | 5/2001 |
| JP | 2010-286838 | 12/2010 |
| JP | 2012-132856 | 7/2012 |
| KR | 2004-0070627 A | 8/2004 |
| WO | 2013/171896 A1 | 11/2013 |

OTHER PUBLICATIONS

International Search Report of PCT/JP2013/063505, dated Jun. 18, 2013.
Search Report for EP 13806704.6, dated Feb. 17, 2016.
Office Action dated Jul. 7, 2016 in corresponding CN application 201380042992.8.
Korean Office Action for Korean matter 10-2015-7001523, dated Aug. 3, 2016 + full translation.

* cited by examiner

DEVICE FOR MEASURING ROTATION ANGLE ACCELERATION

TECHNICAL FIELD

The present invention relates to a gyroscope for measuring an angular acceleration. In particular, in a case where (i) accelerations except a specific angular acceleration cause a problem of noise and (ii) low-cost production is required, the present invention provides a device for measuring an angular acceleration which device has reduced noise that is caused by accelerations except the specific angular acceleration, by having an arrangement in which an oscillator is supported by a spring structure capable of greatly restraining movement in directions except a specific rotation direction.

BACKGROUND ART

Conventionally known gyroscopes for measuring an angular acceleration encompass a gyroscope that holds a rotor that rotates at a high speed in a gimbal mechanism, a gyroscope employing a laser interferometer, and a gyro sensor in which a planar spring is formed on a silicon wafer.

CITATION LIST

Patent Literatures

Patent Literature 1

Japanese Patent Application, Tokugan, No. 2010-286838

Patent Literature 2

PCT/JP2012/062789

SUMMARY OF INVENTION

Technical Problem

Among the above conventional techniques, as to the gyroscope which holds a rotor that rotates at a high speed in a gimbal mechanism, it has been known that friction caused by a holding mechanism such as a bearing for holding a rotating shaft gives a harmful effect to measurement. Further, it has also been known as a problem that a mechanism of such a gyroscope is complex and expensive. As to the gyroscope employing a laser interferometer, similarly, it has been known that a mechanism of the gyroscope is complex and expensive. Furthermore, as to the gyro sensor in which a planar spring is formed on a silicon wafer, it has been known that: the rotating shaft is not fully held, and therefore, an oscillator moves due to accelerations in directions except a direction of a specific angular acceleration; and consequently, noise is superimposed on an angular acceleration signal. This phenomenon is so-called crosstalk. In order to reduce crosstalk, many gyro sensors have been arranged to have (i) a mechanism in which a plurality of oscillators are provided and a relative movement of the oscillators is measured so that components except a component of an angular acceleration are cancelled or (ii) a mechanism in which a plurality of displacement sensors are provided around an oscillator and displacement by movement caused by accelerations except the angular acceleration are cancelled. However, it has been difficult to cancel completely the crosstalk by the above mechanisms. Further, structures of the mechanisms have become complex, which has resulted in cost increase.

Meanwhile, the inventor of the present invention has previously developed a structure capable of making it sure that necessary rotation within a limited angle range is carried out by spring distortion, for a mechanism where little amount of rotation occurs among high-precision mechanisms required to have a rotating shaft. Further, the inventor of the present invention has filed an application for this structure as a novel rotating shaft holding mechanism that has not conventionally existed (see Patent Literatures 1 and 2).

An object of the present invention is to solve the above problems by improving the above novel rotating shaft holding mechanism for use in a device for measuring an angular acceleration, and in particular, to provide, at low cost, a device for measuring an angular acceleration which device can prevent any acceleration except a specific angular acceleration from being superimposed as noise.

Solution to Problem

In order to solve the above problem, a device of the present invention for measuring an angular acceleration is configured to include: an oscillator rotating around a rotating shaft as a center; a plurality of nodes for supporting the oscillator, the plurality of nodes each being provided at a point on a circle whose radius is r and whose center is the rotating shaft; a plurality of parallelogram links each having arms whose length is r, the arms making movement of the plurality of nodes supporting the oscillator become circular movement around the rotating shaft as a center; a supporting section for supporting fixed nodes of the plurality of parallelogram links; a rotation angle detecting section for detecting a rotation angle; and a calculation section for calculating an angular acceleration from the rotation angle.

Further, the device of the present invention for measuring an angular acceleration is configured to further include: an actuator for applying force so as to make a displacement angle of the oscillator zero; a feedback control section for controlling an input signal to be supplied to the actuator in accordance with a measurement signal of the displacement angle, the input signal being controlled so that the displacement angle becomes zero; and a calculation section for calculating an angular acceleration from the input signal supplied to the actuator.

Furthermore, the device of the present invention for measuring an angular acceleration is configured such that: the rotation angle detecting sensor, the actuator, the control section, the calculation sections, and a supporting mechanism of the rotating shaft are integrally formed by use of a semiconductor microfabrication technology, by forming the supporting mechanism as a planar hinge structure.

Advantageous Effects of Invention

The present invention makes it possible to provide, at low cost, a gyro sensor that is not influenced by accelerations except an angular acceleration even in a case where crosstalk is a problem. Further, in a case where a calculation section for calculating an angular acceleration is integrally fabricated by a semiconductor microfabrication technology, the cost can be further reduced.

DESCRIPTION OF EMBODIMENTS

Figure 1:
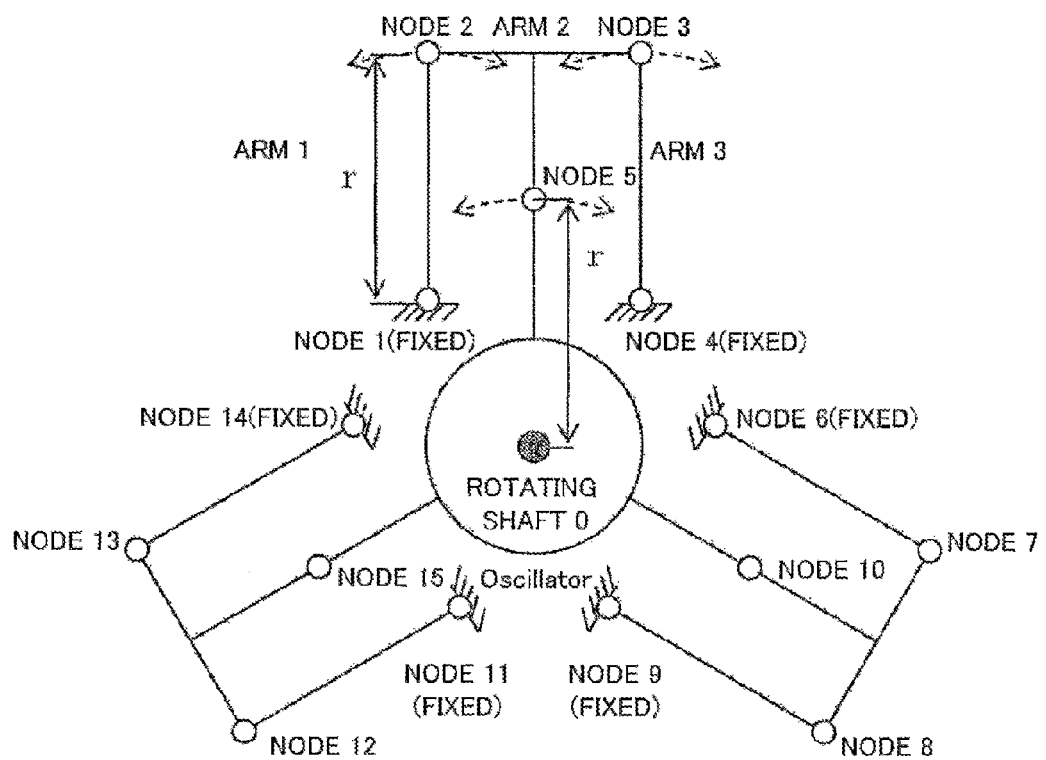
FIG. 1 is a schematic diagram illustrating a rotating shaft holding mechanism of a device of the present invention for measuring an angular acceleration.

The present invention has a planar link mechanism in which a plurality of parallelogram hinges are provided around a rotating shaft O so as to have the rotating shaft O at the center, as illustrated in FIG. 1. The plurality of parallelogram hinges serve as a spring structure that supports an oscillator for detecting an angular acceleration. One of the plurality of parallelogram hinges has an arm 2 whose movement is restrained by fixed nodes 1 and 4 and thereby, becomes rotational movement within a predetermined angle range. Further, at a position apart from the rotating shaft O by a distance equal to a length r of an arm 1, a node 5 between the arm 2 and the oscillator is provided so that movement of the node 5 is rotational movement around the rotating shaft O as a center. The plurality of parallelogram hinges arranged like the above-described one parallelogram hinge are provided around the rotating shaft at the center in a flower petal form, so that movement of all of the node 5, a node 10, and a node 15 for supporting the oscillator become rotational movement around the rotating shaft as a center.

As a result, movement of the oscillator is limited to rotational movement within a predetermined angle range around the rotating shaft as a center. By having a configuration including this rotating shaft holding mechanism, the oscillator does not move in a case where an acceleration in a direction except the rotation direction is applied to the oscillator. This makes it possible to greatly suppress crosstalk in the gyro sensor.

The present invention is configured to include a displacement sensor or a force sensor for detecting movement of the oscillator supported by the above rotating shaft holding mechanism.

The present invention is also configured to include a calculation section for analyzing an output signal of the displacement sensor or the force sensor and converting the output signal to an angular acceleration.

The present invention makes it possible to fabricate, in a package, the gyro sensor including the rotating shaft holding mechanism, the oscillator, and the displacement sensor or the force sensor, by a semiconductor microfabrication technology, particularly for the purpose of producing the gyro sensor at low cost. The present invention makes such fabrication possible by providing the rotating shaft holding mechanism as a hinge mechanism as illustrated in FIG. 2 and forming the displacement sensor or the force sensor on a surface of the hinge mechanism.

EXAMPLES

Figure 2:
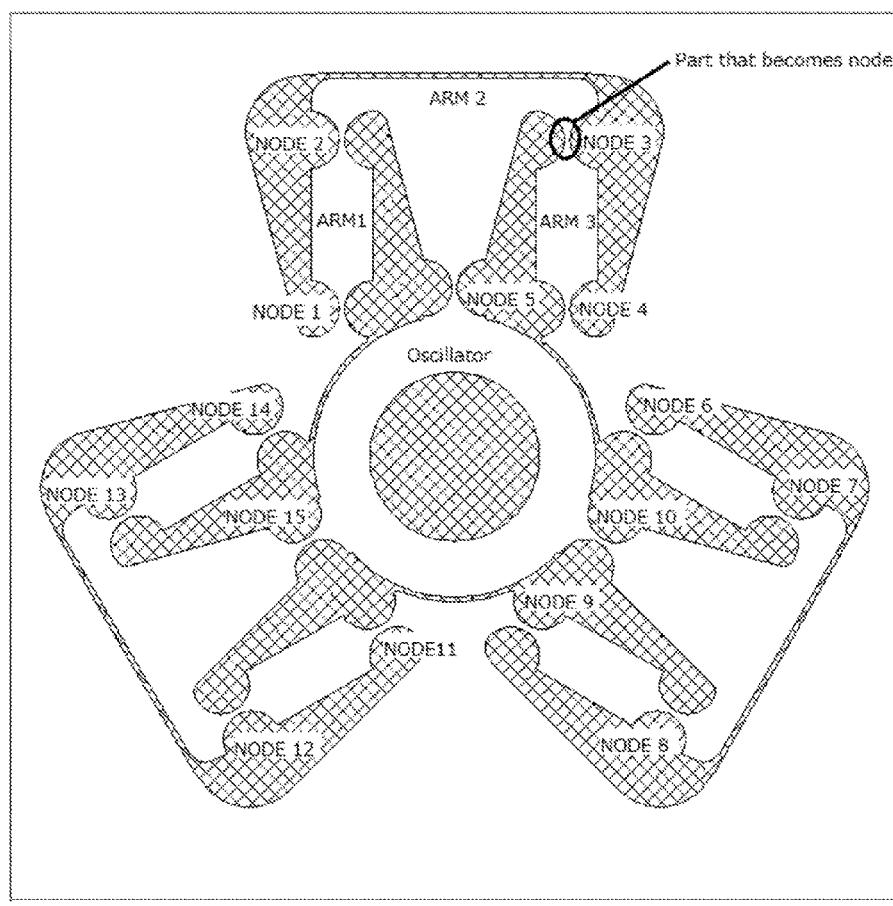
FIG. 2 is a schematic diagram illustrating a hinge structure for providing a device of the present invention for measuring an angular acceleration by use of a semiconductor microfabrication technology.

FIG. 2 shows a relation between a hinge structure of a rotating shaft holding mechanism and a displacement sensor in a device of the present invention for measuring an angular acceleration. The hinge structure of the rotating shaft holding mechanism is configured by providing through holes shown as blank parts in FIG. 2. The holes penetrate a planar plate having a certain amount of thickness. Then, particularly, a thin part where arcs of adjacent holes are close to each other easily bends and becomes a node. In a case where the thickness of the planar plate is sufficiently thick relative to a width of the thin part, deformation of the node is limited to only bending within a plane. A combination of such nodes is provided so as to achieve a link structure of the rotating shaft holding mechanism illustrated in FIG. 1.

Figure 3:
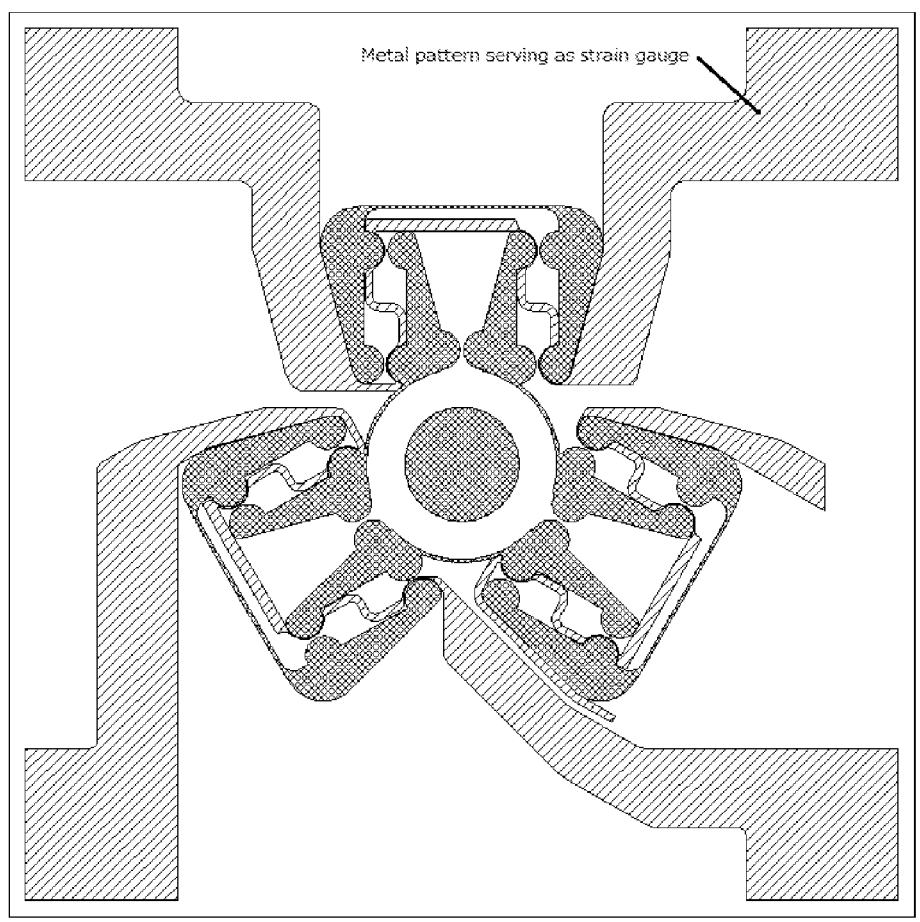
FIG. 3 is a schematic diagram of a hinge structure and a metal strain gauge pattern for providing a device of the present invention for measuring an angular acceleration by use of a semiconductor microfabrication technology.

FIG. 3 is a schematic diagram illustrating a case where a pattern of a metal strain gauge is formed on a surface of the hinge mechanism illustrated in FIG. 2. When a node deforms, one side of the node is compressed while the other (opposite) side of the node is strained. In a case where a metal line is formed only on one side on a surface of the node, the metal line deforms due to stress caused by such compression and strain. As a result, a minute change in resistance value occurs. In a case where the deformation of the node is small, the change in resistance value and a rotation angle of the deformation are proportional to each other. Then, the deformation of the node is detected by detecting with use of a minute resistance change detecting section such as a bridge circuit. The pattern of the metal strain gauge starts from one electrode and reaches the other electrode, passing one side of each node in turns in a manner such that the pattern passes one side of one node and then one side of another node which side of the another node is on a side opposite to the one side of the one node. Accordingly, stress of either contraction or strain of each node can be detected.

In a case where a predetermined angular acceleration is applied to a rotating shaft, a hinge of the rotating shaft holding mechanism deforms and a torque T proportional to a rotation angle θ occurs. At a position where a torque caused by inertial force due to the angular acceleration and the torque caused by the deformation of the hinge are in equilibrium, rotation stops. This relation is expressed by the following equation (1):

$$Id^2\theta/dt^2 = T = k\theta \qquad (1),$$

where a rotation moment of the oscillator is I, and a rotational spring content is k.

The angular acceleration is expressed by the following equation (2), by deforming the above equation (1):

$$d^2\theta/dt^2 = k\theta/I \qquad (2)$$

Therefore, if the spring constant k and the inertial moment I have been obtained in advance, then, the angular acceleration can be calculated by measuring an angle θ at the position in equilibrium.

Even in a case where the angular acceleration changes with time, an inputted angular acceleration can be obtained from a change of the angle θ with time by use of the above motion equation (1).

As a method for integrally fabricating the hinge structure of the rotating shaft holding mechanism and the displacement sensor with use of a semiconductor processing technique, there is the following method:

(1) form a metal film for forming a strain gauge, on a silicon wafer having a thin oxide film;
(2) etch the metal film, after applying a resist on the metal film and exposing and developing a pattern of the strain gauge;
(3) expose and develop a pattern of the hinge structure, after applying a resist on a back surface;
(4) form the through holes from the back surface by use of a deep reactive ion etching apparatus; and
(5) provide wiring to electrodes.

This method makes it possible to fabricate a base structure of a gyro sensor at low cost, by using only two photo masks.

For a method of detecting the rotation angle θ, it is possible to utilize, other than the metal strain gauge as described above, a semiconductor strain gauge, a piezoelectric deformation sensor, a static capacitance displacement sensor, or an electromagnetic displacement sensor.

It is alternatively possible to obtain the angular acceleration, by (i) first connecting an actuator to the arm 2 of the rotating shaft holding mechanism, (ii) applying force to the actuator by feedback control so as to make a rotation angle of the hinge structure become zero at the time when the angular acceleration is applied, and (iii) calculate the angular acceleration from a magnitude of an inputted force required at the time when the force is applied to the actuator. As means employed as the actuator, it is possible to employ a comb electrode actuator, a piezoelectric element actuator, an electromagnetic-force actuator, or the like.

In a case where a force censor attached to the arm 2 of the rotating shaft holding mechanism is a force sensor, such as a piezoelectric element or a tuning fork-type sensor, which hardly deforms, the rotating shaft holding mechanism hardly rotates. Accordingly, a torque applied to the rotating shaft is not influenced by the inertia moment of the oscillator, and the like. Therefore, the torque applied to the rotating shaft can be directly measured.

As described above, in a case where a silicon wafer is used, it is possible to integrally form a detection circuit of a sensor, a calculation circuit, etc. on a sensor surface. Industrial Applicability The present invention provides a low-crosstalk and low-cost gyro sensor. When a high-performance and low-cost gyro sensor is provided, it is possible to employ a low-cost and light-weight sensor in place of a high-performance and high-cost heavy gyro sensor such as an optical fiber gyroscope in a field where the high-performance and high-cost heavy gyro sensor has been conventionally employed. This may lead to reduction in weight and size and improvement in performance of a control device for, for example, a rocket, a satellite, etc.

The invention claimed is:

1. A device for measuring an angular acceleration acting on the device, the device comprising:
   an oscillator rotating around a rotating shaft as a center;
   a plurality of nodes for supporting the oscillator, the plurality of nodes each being provided at a point on a circle whose radius is r and whose center is the rotating shaft;
   a plurality of parallelogram hinges each having a pair of parallel arms whose length is r and a coupling arm connecting the pair of parallel arms, the parallel arms making a movement of the plurality of nodes supporting the oscillator become a circular movement around the rotating shaft as the center;
   wherein a movement of each of the coupling arms is restrained by a plurality of fixed nodes attached to the respective free ends of the parallel arms of each of the parallelogram hinges;
   a supporting section for supporting the fixed nodes of each of the plurality of parallelogram hinges;
   a rotation angle detecting sensor for detecting a rotation angle of the rotating oscillator; and
   a calculation section for calculating the angular acceleration from the rotation angle.

2. The device as set forth in claim 1, wherein:
   the rotation angle detecting sensor, the calculation section, and the supporting section are integrally formed by use of a semiconductor microfabrication technology, by forming a supporting mechanism of the rotating shaft as a planar hinge structure.

\* \* \* \* \*